United States Patent [19]

Kadowaki et al.

[11] Patent Number: 4,813,587
[45] Date of Patent: Mar. 21, 1989

[54] WORKING LINE FOR SIDE PANEL FOR MOTORCAR

[75] Inventors: Satoshi Kadowaki; Hiroyuki Furuya, both of Sayama, Japan

[73] Assignee: Honda Giken Kogyo Kabushiki Kaisha, Tokyo, Japan

[21] Appl. No.: 46,610

[22] Filed: May 7, 1987

[30] Foreign Application Priority Data

| May 7, 1986 | [JP] | Japan | 61-103012 |
| May 7, 1986 | [JP] | Japan | 61-103013 |
| May 7, 1986 | [JP] | Japan | 61-103014 |
| May 12, 1986 | [JP] | Japan | 61-107847 |
| Aug. 13, 1986 | [JP] | Japan | 61-188643 |

[51] Int. Cl.$^4$ .......................... B23K 37/04
[52] U.S. Cl. ...................... 228/4.1; 228/47; 219/80
[58] Field of Search ............ 228/4.1, 6.1, 47; 219/80

[56] References Cited

U.S. PATENT DOCUMENTS

| 4,160,147 | 7/1979 | Matsubara et al. | 219/80 |
| 4,162,387 | 7/1979 | De Candia | 219/80 |
| 4,404,451 | 9/1983 | Niikawa et al. | 219/80 |
| 4,442,335 | 4/1984 | Rossi | 228/4.1 X |
| 4,535,927 | 8/1985 | Matsubara et al. | 228/6.1 |
| 4,593,850 | 6/1986 | Ariga | 228/47 |
| 4,609,137 | 9/1986 | Fillippis | 228/47 |

FOREIGN PATENT DOCUMENTS

| 117886 | 9/1981 | Japan | 219/80 |
| 2079226 | 1/1982 | United Kingdom . |
| 2133749 | 8/1984 | United Kingdom . |
| 2153752 | 8/1985 | United Kingdom . |
| 2179306 | 3/1987 | United Kingdom . |

Primary Examiner—Kenneth J. Ramsey
Attorney, Agent, or Firm—Armstrong, Nikaido, Marmelstein & Kubovcik

[57] ABSTRACT

A working line for performing certain operations on a side panel for a motorcar including, in order, a set station, a welding station, and a sealing station. A set carrier is reciprocatable on a first railway between the set station and the welding station and carries a set jig on which the side panel components are loadable in a standing posture. Holding members and welding robots are provided on one lateral side of the welding station to receive the side panel, hold it in place, and weld it, all in a standing posture. A discharging carrier is reciprocatable between the welding station and the sealing station on a second railway offset sideways in relation to the first railway and carries a discharging jig for receiving the welded side panel and conveying it in its standing posture to the sealing station. A sealing jig and a sealing agent application robot are disposed at the sealing station opposite one to another on both sides of the second railway. A particular X link mechanism attaches the set jig to a link base on the set carrier to enable the set jig to be movable laterally of the carrier. A particular supporting frame attaches the discharging jig to the discharging carrier to enable the jig to be movable both laterally and vertically of the carrier.

13 Claims, 18 Drawing Sheets

FIG. 1
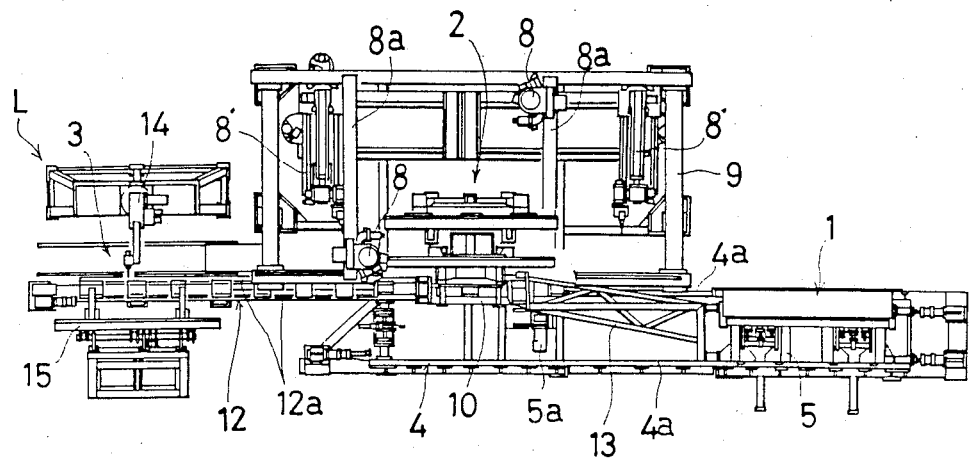
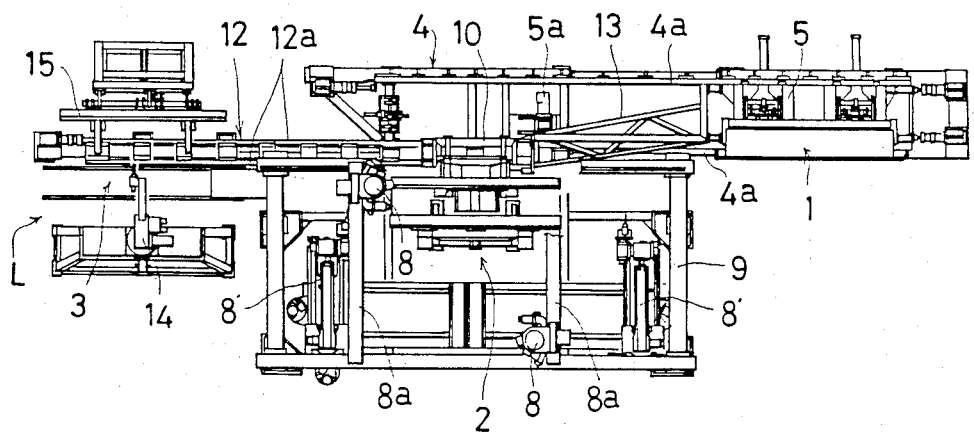

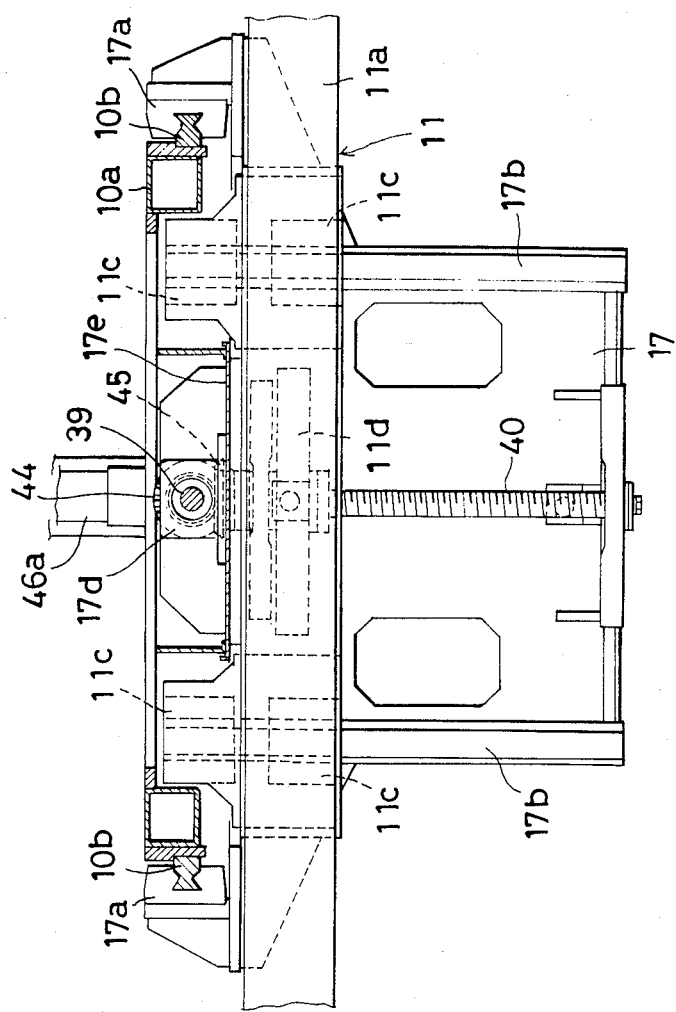

WORKING LINE FOR SIDE PANEL FOR MOTORCAR

BACKGROUND OF THE INVENTION

This invention relates to a working line for performing certain operations such as welding or the like to a side panel for a motorcar as it moves along the line.

A previously known working line of this kind has a set carrier which is reciprocatable between a set station and a welding station following the set station so that, at the set station, plural component parts for constituting a side panel are set on a set jig on the carrier, and, at the welding station, the component parts are welded together to be formed into a welded side panel.

It has been usual with this type of working line that the side panel composed of plural component parts is set in a horizontal posture on the set jig, and is welded by welding robots disposed on both lateral sides of the welding station.

Additionally, a known working line has a sealing station disposed following the welding station, and a discharging carrier which is reciprocatable between the two stations. The discharging carrier has a receiving jig for receiving the side panel in its horizontal posture after the welding is finished so that at the sealing station, a sealing agent may be applied to the side panel by sealing agent application robots disposed on both lateral sides thereof.

The above described working lines involve certain inconveniences in that because the side panel is set on the set jig in a horizontal posture, the setting operation, at the set station, has to be carried out by a worker leaning forward over the set jig, so that the setting workability becomes low. Additionally, since, at the welding station or at the sealing station, the welding robots or the application robots are disposed on both lateral sides of the railway for the carrier, these stations are comparatively large in their lateral widths and space needed for the working line is increased.

OBJECTS AND SUMMARY OF THE INVENTION

A first aspect of this invention has for its object to provide a working line by which the operation of setting of a side panel to a set jig can be facilitated, and in which welding robots and others are provided concentratedly on one lateral side of a welding station so that the lateral width of the welding station can be narrowed, and a working operation can be carried out at a high efficiency. According to this aspect of this invention, in a working line of the type that is provided with a set station and a welding station following the same, the invention is characterized in that a set carrier provided with a set jig for a side panel which is settable thereon in its standing posture from one lateral side is reciprocatable between the set station and the welding station, and holding members for the side panel and welding robots are provided at the welding station positioned on one lateral side of a railway for the set carrier so that, at the welding station, the side panel on the set jig may be transferred, as it is in its standing posture, to the holding members.

Accordingly, to a second aspect of this invention, in the featured arrangement of the foregoing first aspect of this invention, the invention is characterized in that, in order that a sealing station be contained in a lateral width range of the welding station a discharging carrier is provided which is reciprocatable between the welding station and the sealing station along on a railway which is laid so as to be offset sideways in relation to the railway for the set carrier, and the discharging carrier is loaded with a discharging jig for receiving the side panel after it is welded by the welding robot, from the holding members, as it is in its standing posture, and an application robot for applying a sealing agent and a sealing jig for holding the side panel are disposed on the sealing station opposite one to another and on both lateral sides of the railway for the discharging carrier so that, at the sealing station, the side panel on the discharging jig may be transferred, as it is in its standing posture, to the sealing jig.

The operation of this invention working line is explained as follows:

At the set station, component parts for a side panel are set, in their standing posture, on to the set jig from one lateral side thereof. Then the set carrier is moved forward to the welding station. These component parts are transferred to the holding members under the condition that those are welded together temporarily by the welding robots. Thereafter, those partially welded component parts are additionally welded by the welding robots and formed into an integral side panel. During this further welding operation, the empty set carrier is moved back to the set station so that the next setting operation for the next side panel may be carried out.

In this case, the setting of the side panel, that is, component parts thereof, to the set jig is carried out with the component parts in their standing posture so that the setting work of a worker can be carried out without compelling the worker to take such an unnatural posture as required by the conventional case.

Additionally, in contrast with the case of the conventional type wherein the side panel is introduced into the welding station in its horizontal posture, the holding members and the welding robots can be disposed at the welding station positioned on one side thereof opposite to the set jig. As a result, the width of the welding station can be narrowed. Also, during the welding operation, the next setting operation at the set station can be carried out simultaneously with the welding operation, and thereby the workability can be improved.

According to the second aspect of this invention, the side panel after being subjected to the foregoing welding, is received, as it is in its standing posture, from the holding members onto the discharging jig on the discharging carrier, and is then conveyed by the movement of the discharging carrier. Thereafter it is transferred, as it is in its standing posture, to the sealing jig and is applied with the sealing agent by the applying robot.

Owing to the fact that the side panel is transferred to the sealing jig, it becomes possible, during the sealing operation, that the empty discharging carrier is moved backwards to the welding station to be ready for receiving the next side panel. After the completion of the operations at the welding station and at the sealing station, the side panel is conveyed to the sealing station immediately after the completion of the welding operation, and thus the working efficiency can be improved.

In such an arrangement at the sealing station that the application robot is disposed on the one lateral side of the railway for the discharging carrier, and the sealing jig is disposed on the other lateral side thereof, if the railway for the discharging carrier and the railway for the set carrier are disposed in longitudinal alignment with each other, even if the welding equipment including the welding robots are positioned concentrated on the one lateral side of the railway, the sealing jig would be largely protruded, at the sealing station, from the other lateral side of the discharging railway, so that the whole of the working line would become large in the lateral width thereof. However, according to the second aspect of this invention, the railway for the discharging carrier is laid to be offset sideways outwardly in relation to the railway for the set carrier, so that the sealing jig can be provided within a space which is an extended area open ahead of the railway for the set carrier, and the width of the whole of the line can be narrowed and the space utilization efficiency can be improved.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 is a top plan view of a whole of a working line wherein a pair of this invention working lines are disposed in parallel one with another;

FIG. 13 is an enlarged sectional view of a slide support point portion of the X link mechanism, taken along the line XIII—XIII in FIG. 10a;

FIG. 19 is a top plan view of the moving mechanism viewed according to an arrow direction of the Y axis in FIG. 17.

DETAILED DESCRIPTION OF A PREFERRED EMBODIMENT

One embodiment of this invention will now be explained with reference to the accompanying drawings:

Referring to FIG. 1, a symbol L denotes a working line for a side panel W, and, in the illustrated example, a pair of left and right working lines are disposed in parallel one with another so that working on the side panel W on each of left and right sides mat be carried out in the working line L on each side.

Figure 2:
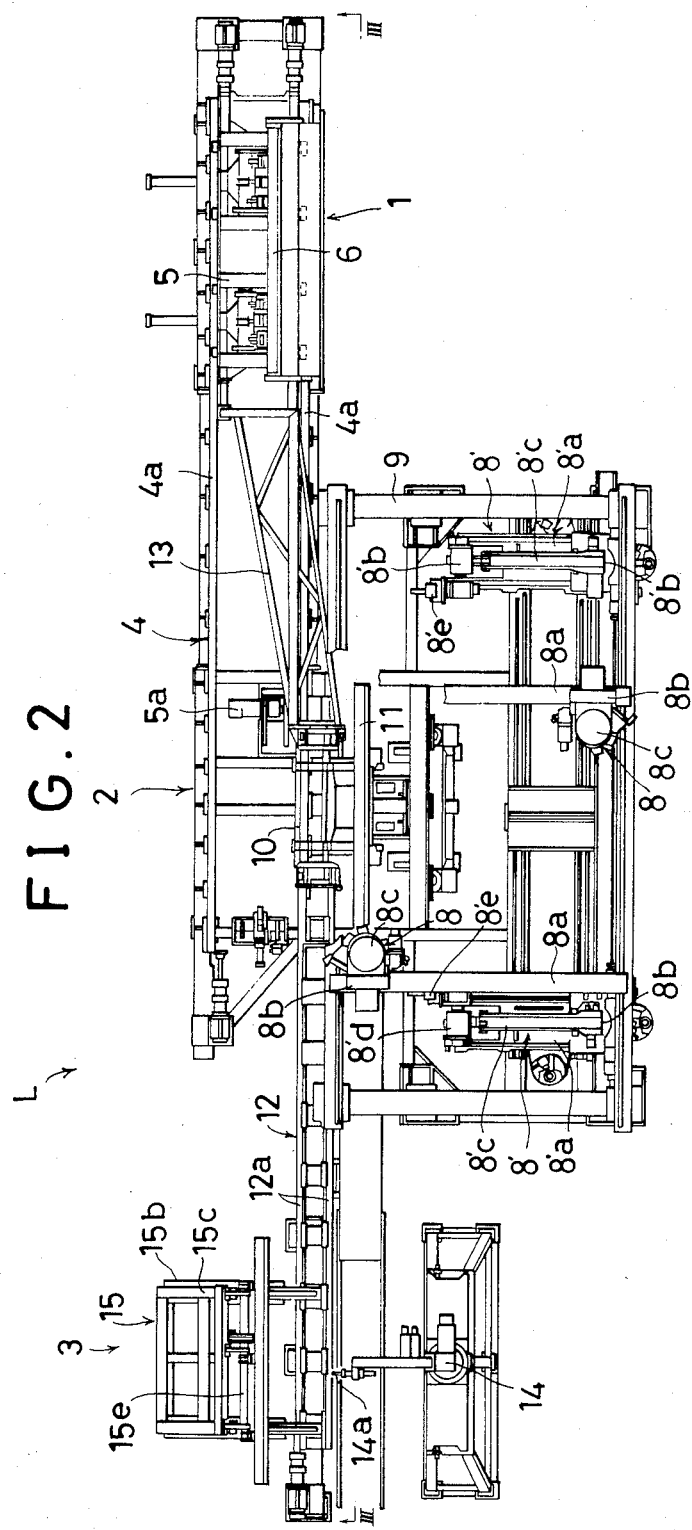
FIG. 2 is a top plan view of the working line on the side thereof.
Figure 3:
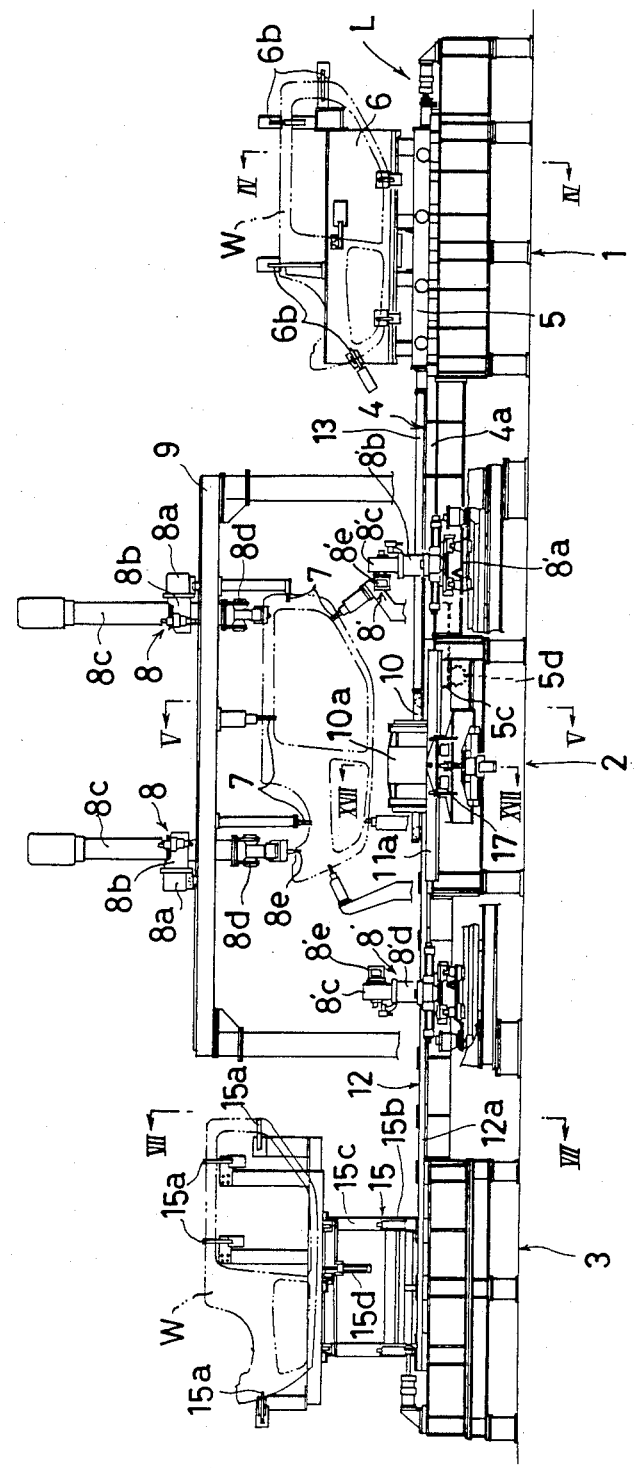
FIG. 3 is a side view of the working line viewed from the line III—III in FIG. 2.
Figure 4:
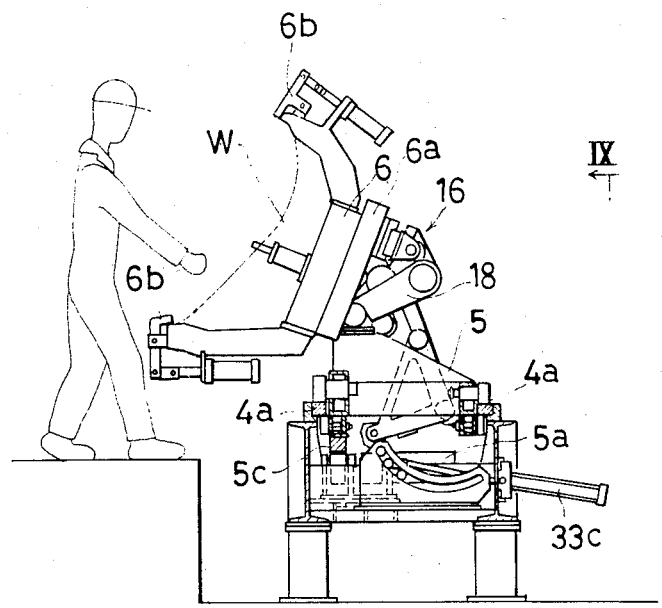
FIG. 4 is a front view of a set station, at the time of setting of a side panel, viewed from the line IV—IV in FIG. 3.

The working line L on each side is provided, from a starting point towards a finished point, with a set station 1, a welding station 2, and a sealing station 3, in order, as shown in FIGS. 2 and 3. A set carrier 5 is reciprocatable between the set station 1 and the welding station 2 along the rails 4a, 4a of a first railway 4 extending between the two stations 1 and 2. The set carrier 5 is loaded with a set jig 6 on which, as shown in FIG. 4, the side panel W (strictly speaking, the comprising component parts such as, an outer panel and various kinds of inner members for constituting the side panel W) may be settable in its standing posture from one lateral side thereof, for instance, from lateral outside thereof, where a space between the parallel working lines L, L is assumed to be considered as a lateral inside. Additionally, holding members 7 for holding the side panel W and welding robots 8, 8' are arranged at the welding station 2 and positioned on the lateral outside of the first railway 4 so that, at the welding station 2, the side panel W set on the set jig 6 may be transferred, at it is in its standing posture, to the holding members 7.

More in detail, a machine frame 9 is set up at a lateral outside region of the first railway 4 at the welding station 2. A plurality of the holding members 7 of clamper type for holding the side panel W at desired plural positions thereof are attached to upper and lower sides of a lateral inside portion of the machine frame 9. A pair of the welding robots 8, 8 of the hanging type are disposed on a ceiling portion of the machine frame 9, and a pair of the welding robots 8', 8' of floor type are disposed on a lower portion thereof. The foregoing set jig 6 is supported at its jig base 6a, through a X link mechanism 16 on the set carrier 5 and is movable to advance and retreat laterally.

Figure 6:
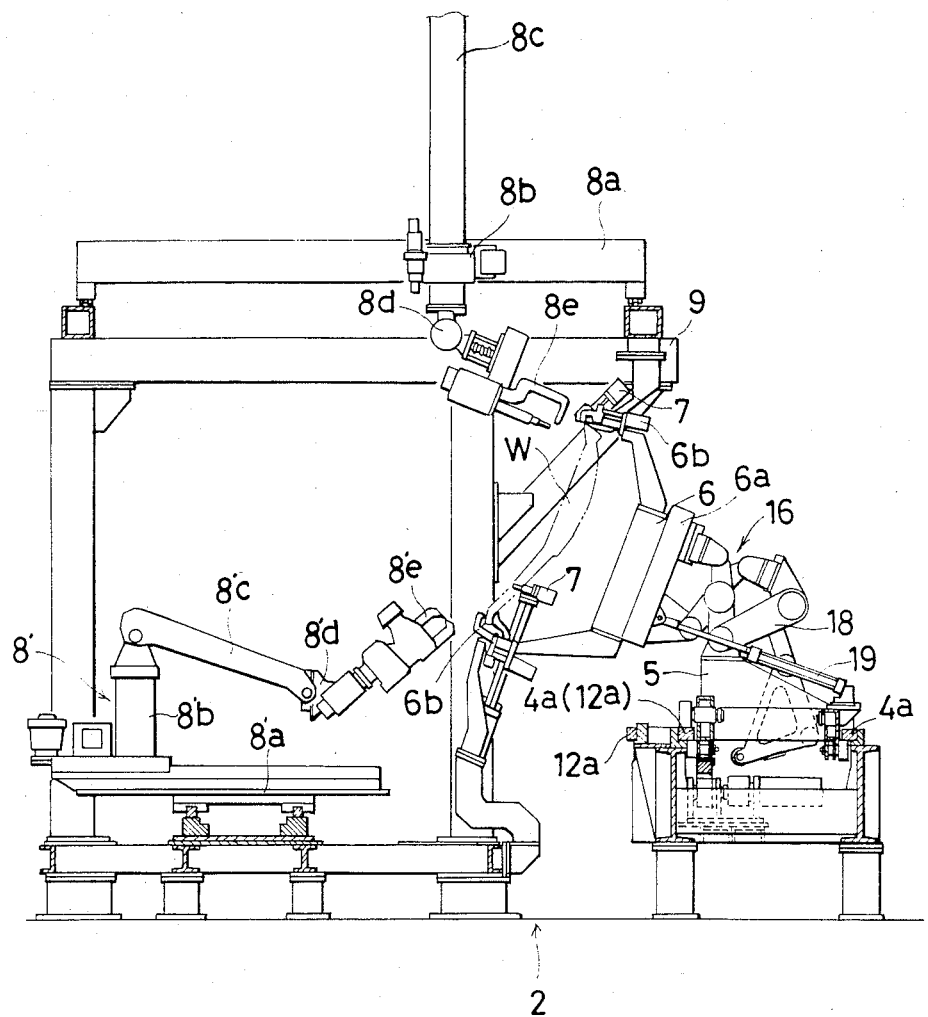
FIG. 6 is a front view of the welding station, at the time of transferring of the side panel to holding members.

Thus, after moving the set carrier 5 to the welding station 2, the set jig is advanced laterally outwards by the X link mechanism 16, as shown in FIG. 6 so that the side panel W may be held by the holding members 7. Under the held condition, a temporary welding of the outer panel and the inner members of the side panel is carried out by the respective welding robots 8, 8', and thereafter clampers 6b provided on the set jig 6 are opened and the set jig 6 is then retreated laterally inwards, so that transferring of the side panel W to the holding members 7 is completed.

Thereafter the set carrier 5 is moved back to the set station 1, and at the same time, the side panel W held by the holding members 7 is applied with additional welding by the respective welding robots 8, 8'.

The hanging type welding robot 8 is constructed with a robot main body 8b laterally movably supported on a frame base 8a which is provided on the ceiling portion of the machine frame 9 to be movable forward and rearward. A welding gun 8e is attached to a wrist portion 8d provided on a lower end of a robot arm 8c which is provided on the main body 8b, to be movable upward and downward. The floor placing type welding gun 8' is constructed with a robot main body 8'b laterally movable loaded on a slide base 8'a which is movable forward and rearward. A welding gun 8'e is attached through a wrist portion 8'd to a forward end of a swingable robot arm 8'c extending from the main body 8'b.

Referring to the drawings, a motor 5a is provided for conveying the set carrier 5. A pinion 5b mounted on an output shaft of the motor 5a meshes with a rack 5c fixed to the carrier 5 so that, by a regular and reverse rotation of the motor 5a, the carrier 5 may be reciprocated between the set station 1 and the welding station 2.

Referring to the drawings, a discharging carrier 10 is reciprocatable between the welding station 2 and the sealing station 3 downstream thereof. A discharging jig 11 for receiving the side panel W, on which the welding operation of the component parts have been finished, from the holding members 7 in its standing posture is mounted on the discharging carrier 10.

The discharging carrier 10 is supported on rails 12a, 12a of a second railway 12 which is laid to be offset in the laterally outside in relation to the first railway 4. The carrier 10 is connected through a connecting frame 13 to the foregoing set carrier 5 so that in accordance with the reciprocating movement of the set carrier 5, the discharging carrier 10 may be reciprocated between the welding station 2 and the sealing station 3 along on the second railway 12. The rail 4a on the lateral outside of the first railway 4 and the rail 12a on the lateral inside of the second railway 12 are formed of a common single rail.

At the sealing station 3, an application robot 14 carrying a sealing agent applying nozzle 14a attached thereto is positioned on a lateral outside of the second railway 12. The sealing jig 15 for holding the side panel W is positioned on a lateral outside thereof so as to be opposite to the applying robot 14. The side panel W on the discharging jig 11 is arranged to be transferred, as it is in its standing posture, to the sealing jig 15.

More in detail, a guide frame 10a is provided on lateral outside portion of the discharging carrier 10 to be extended downwards. A supporting frame 17 for supporting the discharging jig 11 so that the discharging jig 11 may be movable through its jig base 11a, to advance and retreat laterally is supported on the guide frame 10a to be movable upwards and downward, as described hereinafter, so that the discharging jig 11 may be given lateral advancing and retreating movements and elevating and lowering movements caused by a movement of the supporting frame 17.

Figure 5:
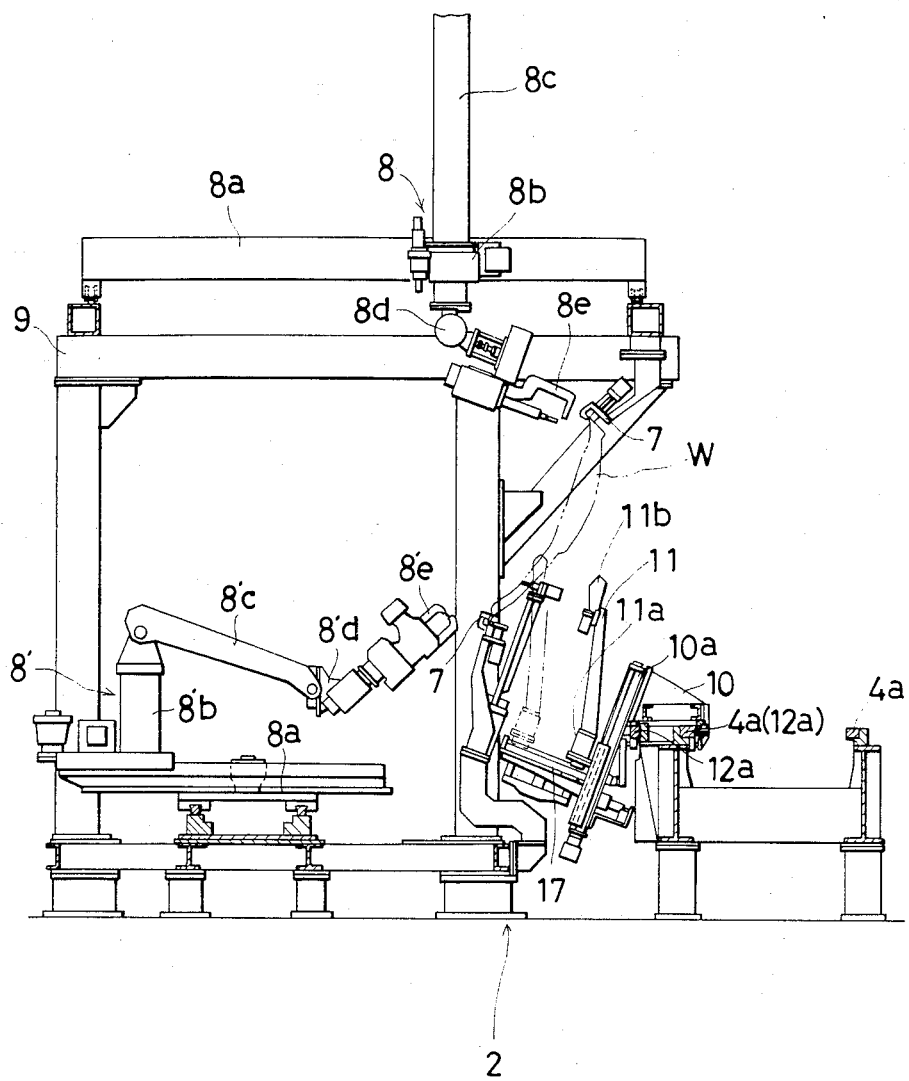
FIG. 5 is a front view of a welding station, at the time of transferring of the side panel to a discharging jig, viewed from the line V—V in FIG. 3.
Figure 7:
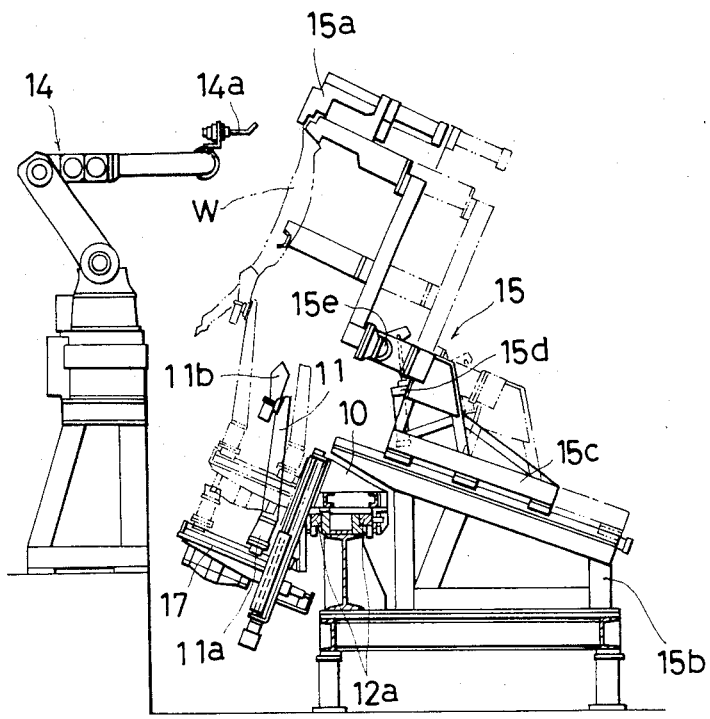
FIG. 7 is a front view of a sealing station, at the time of transferring of the side panel to a sealing jig, viewed from the line VII—VII in FIG. 3.

Thus, after the backward movement of the discharging carrier 10 to the welding station 2, the discharging jig 11 is advanced laterally outwards as shown in FIG. 5, and the side panel W held by the holding members 7 is held by clampers 11b provided on the jig 11. Then the holding members 7 are opened and the jig 11 is retreated laterally inwards. Thus receiving of the side panel W by the jig 11 is completed. Additionally, after the forward movement of the discharging carrier 10 to the sealing station 3, the jig 11 is advanced laterally inwards and is moved upwards, and at the elevated position thereof, as shown in dotted lines in FIG. 7, the side panel W is held by holding members 15a such as clampers, workpiece receiving members or the like provided on the sealing jig 15. Then, after opening of the clampers 11b of the jig 11, the jig 11 is retreated laterally outwards and is lowered, so that the jig 11 may easily move at a position below the side panel W held by the sealing without any interference. Thus, a sealing agent may be applied to the side panel without being obstructed by the jig 11.

The sealing jig 15 has a slide base 15c which is provided on a machine base 15b so as to be movable to advance and retreat laterally, and is so turnable about a shaft 15e by a cylinder 15d as to be changed over between its laterally directing position and its upwardly directing position so that the side panel W be applied with the sealing agent in such a manner that the jig 15 may be advanced and retreated and additionally be turned synchronously with the applying robot 14.

The discharging jig 11 is one for holding the side panel W after it is finished with the welding operation, and is smaller in size than the set jig 6 for which it is necessary to hold and set in position the outer panel and the various kinds of inner members. Accordingly, the discharging carrier 10 can be small-sized and the second railway 12 can be formed into a narrow width one. Thus, even if the second railway 12 is displaced to be biased towards the laterally outside from the first railway 4, an increase in the lateral width of the working line L caused thereby is slight, but rather, by the displacement, it becomes possible that the sealing jig 15 to be positioned on the lateral inside of the second railway 12 of the sealing station 3 is contained in a long space extending ahead of the forward end of the first railway 4, so that the advantageous effect of narrowing of the lateral width becomes noticeably larger. In this manner, the lateral width of the whole of the working line L can be decreased as much as possible as a whole.

Next, a whole operation of the foregoing embodying example will be explaining as follows:

Firstly, at the set station 1, the side panel W before welding is set on the jig 6 on the set carrier. At the same time, at the welding station 2, another side panel W after welding is received by the discharging jig 11 on the discharging carrier 10. Thereafter, the set carrier 5 is moved forward to the welding station 2, and the discharging carrier 10 is moved forward to the sealing station 3.

At the welding station 2, the side panel W on the set jig 6 is transferred, under a temporary welded condition, to the holding members 7 provided on the station 2, and additional welding of the side panel W is then carried out. At the same time, at the sealing station 3, the side panel W on the discharging jig 11 is transferred to the sealing jig 15, and the side panel W is applied with the sealing agent. On the other hand, after the transfer operation, the set carrier 5 is moved backward to the set station 1, and the discharging carrier 10 is moved backward to the welding station, and the components of the next side panel W before welding are set on the set jig 6. By repeating the foregoing operations, the welding operation of the side panel W and the sealing operation of the same are carried out in sequence.

The space between the left and right parallel working lines L, L serves as a working space for replacement of jigs at the time of change in kind or model thereof. Such an arrangement that the welding equipments are placed on the lateral outside of the welding station, and the respective reciprocations of the set carrier 5 and the discharging carrier 10 are carried out on the inside thereof, and additionally the sealing jig 15 is positioned on the lateral inside is advantageous in that it makes it easy to replace the set jig 6, the discharging jig 11 or the sealing jig 15.

The above has been the explanation about the whole construction and operation of this invention working line.

Next, a mechanism for moving the set jig 6 in the lateral direction, and a mechanism for moving the discharging jig 11 upwards and downwards and in the lateral direction will be explained in detail as follows:

In order to achieve the advance and retreat movements of the set jig 6 in the lateral direction, a mechanism, could be provided such that the jig base 6a of the set jig 6 is supported on the set carrier 5 through a guide member such as a guide bar, a guide rail or the like as to be slidably in the lateral direction. In this case, for preventing the set jig 6 from moving unsteadily, it would be necessary to attach the guide member to the set carrier 5 by using an attaching frame of high rigidity, but the whole construction including not only the guide member but also the attaching frame becomes large in size and weight, so that the movability of the set carrier 5 is lowered, and additionally it often happens that sputtered material is caused by welding is adhered to the guide member to result in a trouble in movement of the set jig 6, and this preventive arrangement is not preferable.

If, in contrast with the above, according to this invention, the set jig 6 is arranged to be movable laterally by the X link mechanism 16 as mentioned above, the foregoing inconvenience can be solved and it is advantageous.

The lateral directional moving locus of the set jig 6 is not horizontal but is more or less inclined in the upper and lower directions. Now the construction of the X link mechanism 16 will be explained, assuming that the forward and backward moving locus of the set jig 6 is considered to be an X axis, and the lateral outside is a forward side along the X axis, as follows:

The X link mechanism 16 is interposed between the jig base 6a and a link base 18 provided on the set carrier 5 opposite to a rearward side along the X axis, of the base 6a. A driving cylinder 19 (FIG. 12) which can be expanded and contracted along the X axis is provided between the rear side, along the X axis, of the link base 18 of the set carrier 5 and the jig base 6a so that, expansion and contraction movements along the X axis of the X link mechanism 16 caused by an operation of the cylinder 19, the set jig 6 may be advanced and retreated along the X axis.

Figure 9:
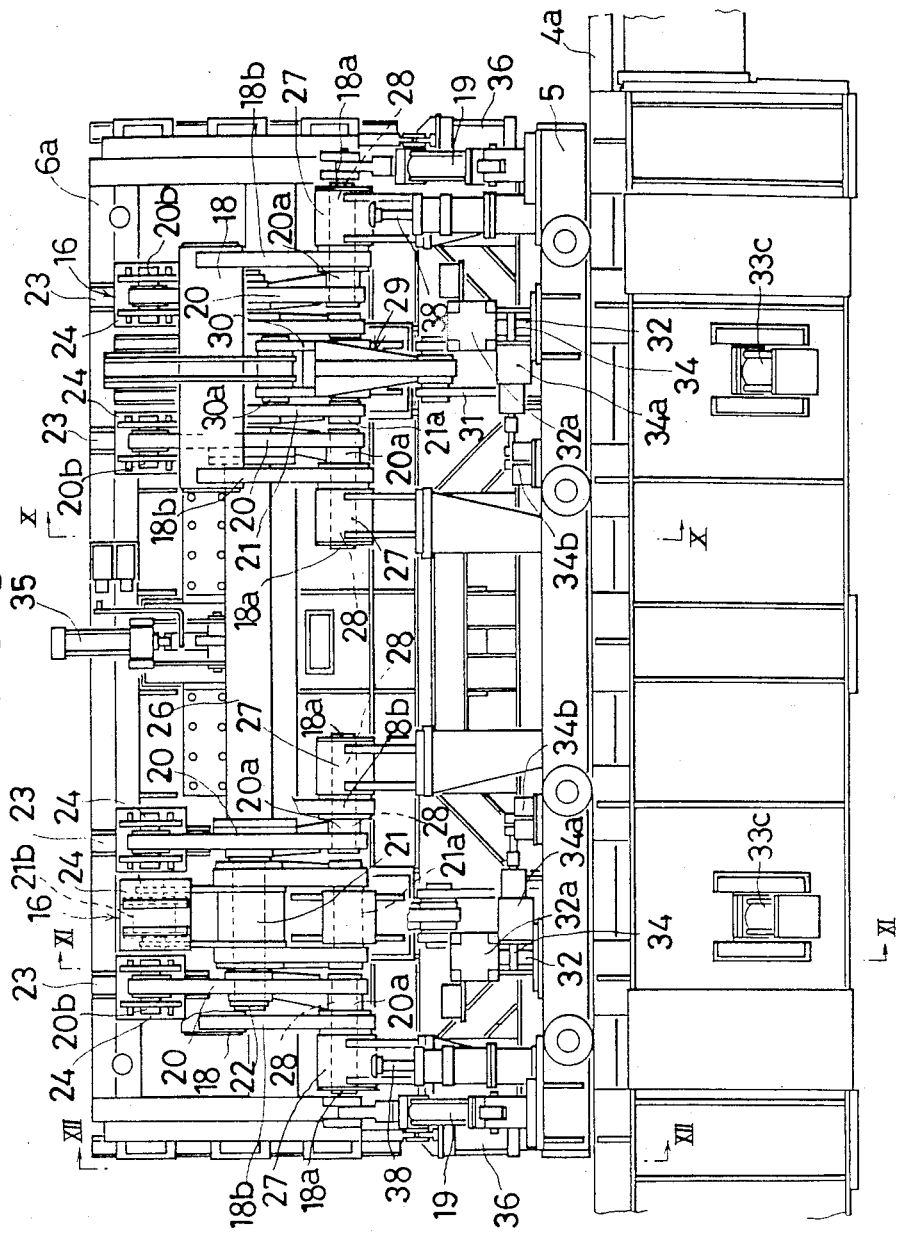
FIG. 9 is an enlarged side view of a set carrier viewed from the line IX—IX in FIG. 4.
Figure 10A:
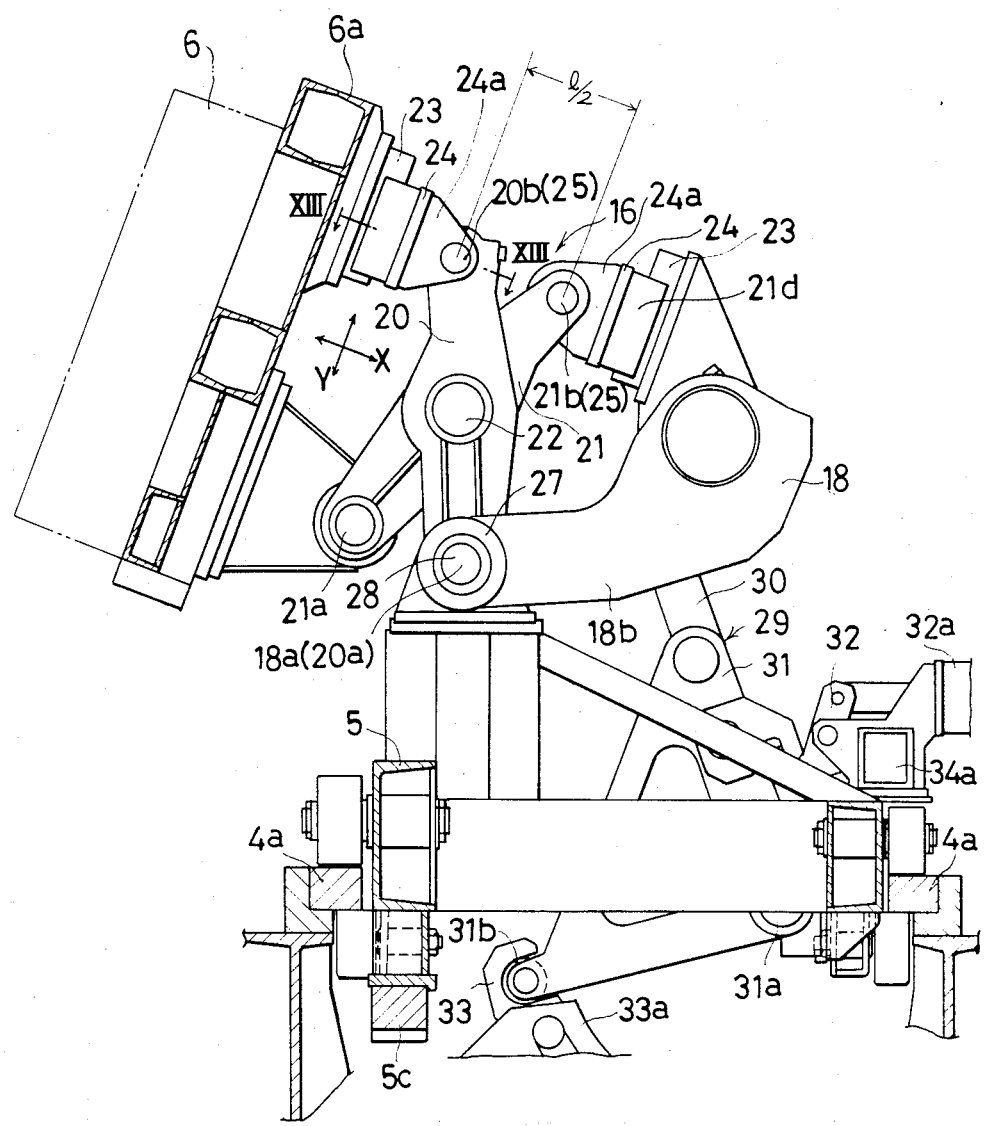
FIGS. 10a, 10b and 10c are sectional views taken along the line X—X in FIG. 9, for showing operative conditions of an X link mechanism at an advanced end position, an intermediate position and a retreated end position of the set jig.

In the illustrated example, as shown clearly in FIG. 9, a pair of X link mechanisms 16 and link bases 18 are disposed so that those mechanism 16, 18 on the left side and those mechanisms 16, 18 on the right side are spaced apart one from another in the left and right directions shown in the drawings. The X link mechanisms 16, 16 each is constructed so that a pair of left and right first links 20, 20 and an intermediate second link 21 are pivotally attached one with another through an longitudinal intermediate common shaft 22. As shown clearly FIGS. 9 and 10, each first link 20 is pivotally attached, through a fixed support point 20a of a lower end thereof, to the link base 18, and is pivotally attached, through a slide support point 20b of an upper end thereof, to the jig base 6a. Additionally, each second link 21 is pivotally attached through a fixed support point 21a of a lower end thereof, to the jig base 6a, and is pivotally attached, through a slide support point 21b of an upper end thereof, to the link base 18 so that, in accordance with the foregoing expansion and contraction movements of the X link mechanism along the X axis, the respective slide supports points 20b, 21b may be moved to a slide along the Y axis crossing at right angles to the X axis.

A conventional X link mechanism publicly known is so arranged that a slide support point of each link thereof is formed of a roller shaft of a guide roller mounted in a longitudinal opening made in each base. This arrangement, however, is inconvenient in that because of the fact that the outer circumferential surface of the guide roller is in linear contact with the inner surface of the longitudinal opening, if a heavy weighted one such as the set jig 6 or the like is loaded thereon, the contact pressure between the opening and the guide roller becomes too large, so that the long opening and the guide roller are liable to be worn by the large friction therebetween and are deteriorated in durability. Additionally, in order to make a smooth rolling movement of the guide roller, it is necessary to make the width of the opening larger than the outer diameter of the guide roll. This arrangement produces a problem in that especially when the set jig 6 is moved laterally, the movable frame is shaky because there is a play gap between the guide roller and the width of the opening and thus the accuracy in setting in position is lowered.

Figure 13:
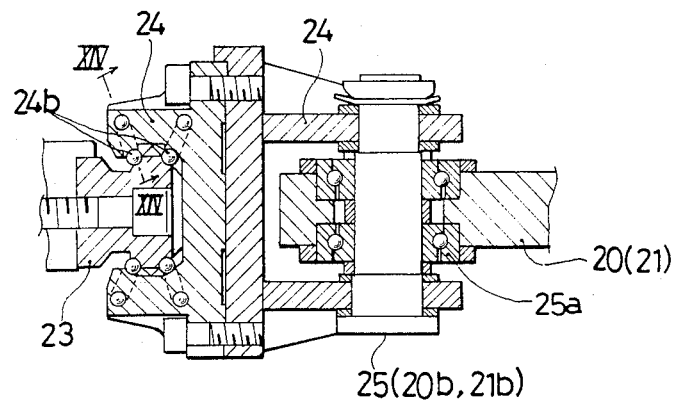

However, according to the illustrated example, as shown clearly in FIGS. 10 and 13, the foregoing respective slide support points 20b, 21b are formed of supporting shafts 25, 25 attached through brackets 24a, 24a, to sliders 24, 24 which are slidably supported, through slide bearings 24b, 24b, on guide rails 23, 23, which extend longitudinally along the Y axis and are fixed to the respective bases 6a, 18 and end portions of the respective links 20, 21 which are pivotally supported, through bearings 25a, 25a, on the respective supporting shafts 25, 25.

Figure 14:
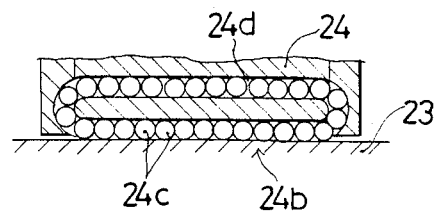
FIG. 14 is a sectional view taken along the line XIV—XIV in FIG. 13.

Four slide bearings 24b are arranged so as to be in abutment with X axis directional front and rear fillet portions formed on both sides of the guide rail 23. Each bearing 24b for the corresponding fillet portion is constructed, as shown clearly in FIG. 13 and FIG. 14 so that a large number of bearing balls 24c are disposed in mutually contacting relationships in the Y axis directional longitudinal endless rolling groove 24d made in such a portion of the slider 24 that faces each fillet portion so that at the time of slide movement of the slider 24, those balls 24c may be moved along the endless rolling groove 24d.

Thus, owing to the foregoing construction, the respective slide support points 20b, 21b are moved smoothly without shaking in the Y axis direction, when the slide movement of each slider 24 along on each guide rail 23 is made in conjunction with the expansion and contraction movements in the X axis direction of the X link mechanism. Additionally, the load applied between the guide rail 23 and the slider 24 is shared distributively by a large number of bearing balls 24c of the slide bearings 24b, so that the durability of the bearing construction can be improved, and the accuracy in setting of the set jig 6 in position can be also improved.

Figure 10B:
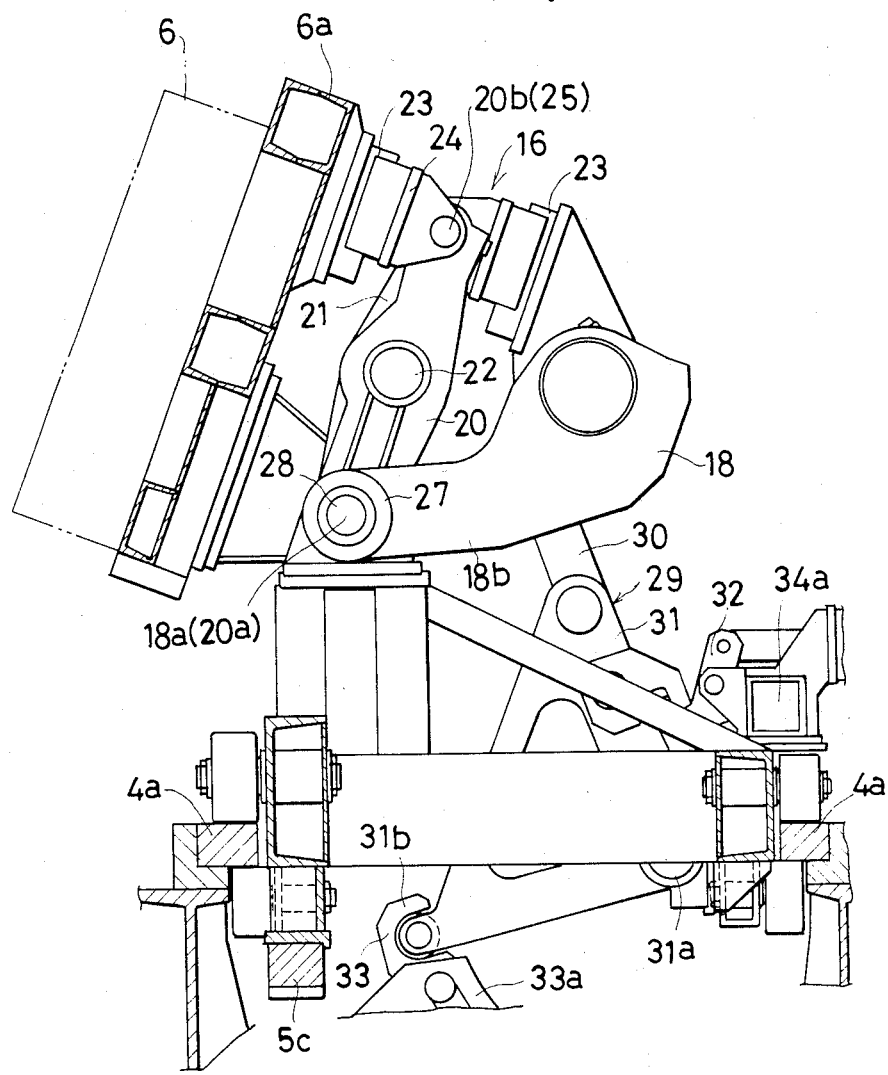

In addition, the X link mechanism 16 is so arranged that at an intermediate position of the moving stroke of the jig base 6a, as shown in FIG. 10b, the same may be formed into the largest contracted condition in which the first and second links 20, 21 are in alignment one with another on a common plane crossing at right angles the X axis. By the expansion operation thereof moving forwards along the X axis direction from the largest contracted condition and by the expansion operation thereof moving rearwards along the X axis therefrom the set jig 6 may be advanced and retreated to the advanced end position of the moving stroke thereof shown in FIG. 10a and the retreated end position thereof shown in FIG. 10c, respectively.

Thus, the distance between the fixed support points 20a, 21a and that between the slide support points 20b, 21b in the advance condition of the set jig 6 can be made as small as 1/2, assuming that the whole length of the moving stroke is l, and a shape formed by the lines connecting between these support points is a rectangle flat in the X axial direction, so that the supporting rigidity of the set jig 6 can be increased. Consequently, the side panel W held on the set jig 6 can be set in position on the set jig 6 and can be transferred to the holding members 8 accurately.

Figure 10C:
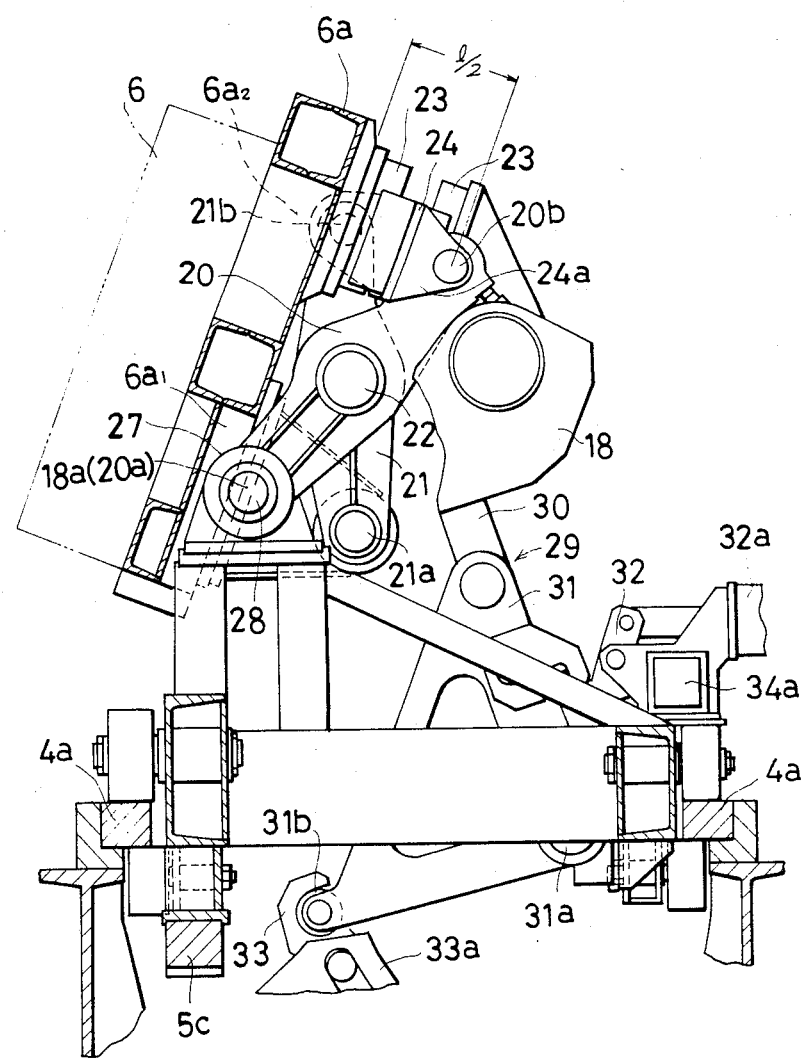

When the jig 6 is retreated, the fixed support point 21a and the slide support point 20b on the jig base 6a side are moved into the rearward side of the X axis beyond the fixed support point 20a and the slide support point 21b on the link base 18 side. The respective support points 20a, 21b on the link base 18 side are moved to enter recessed escape portions $6a_1$, $6a_2$ made in the rear surface of the jig base 6a, as shown in FIG. 10c, so that the two bases 6a, 18 are brought nearer one to another as much as possible. Consequently, the whole of the X link mechanism 16 is brought in a compact condition on the set carrier 5, and accordingly the set carrier 5 and the set jig 6 can be improved in stability. The set carrier 5 can be moved at a high speed between the welding station 2 and the set station 1, so that the workability can be improved.

Referring to the drawings, a synchronizing shaft 26 is connected between the X link mechanisms 16, 16 on the front and rear sides.

Figure 8:
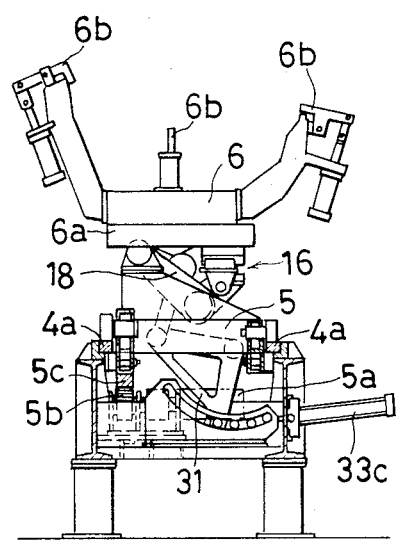
FIG. 8 is a front view of the set station corresponding to FIG. 4, at the time of replacing of the set jig.

In order to make it possible, at the time of replacement of set jigs, for the set jig 6 to be brought downwards to its horizontal posture as shown in FIG. 8, the foregoing link base 18 is pivotally supported on the set carrier 5 to be swingable upwards and downwards.

More in detail, in the illustrated example, in order to simplify a pivot support point 18a of the link base 18 and the fixed support point 20a of the first link 20 are composed of a single common shaft. The set carrier 5 is provided thereon with each pair of bearings 27, 27 on the left side and the right side as shown in FIG. 9. The first link 20 on each side of each X link mechanism 16 is connected to a pivot shaft 28 supported on each bearing 27. The link base 18 is supported, at each leg member 18b on each side of a lower portion thereof, on the pivot shaft 28 so that the two pivot points 18a, 20a may be formed by the pivot shaft 28. Additionally, a toggle link mechanism 29 is connected to the link base 18 so that the link base 18 may be moved to incline through the link mechanism 29.

Figure 11:
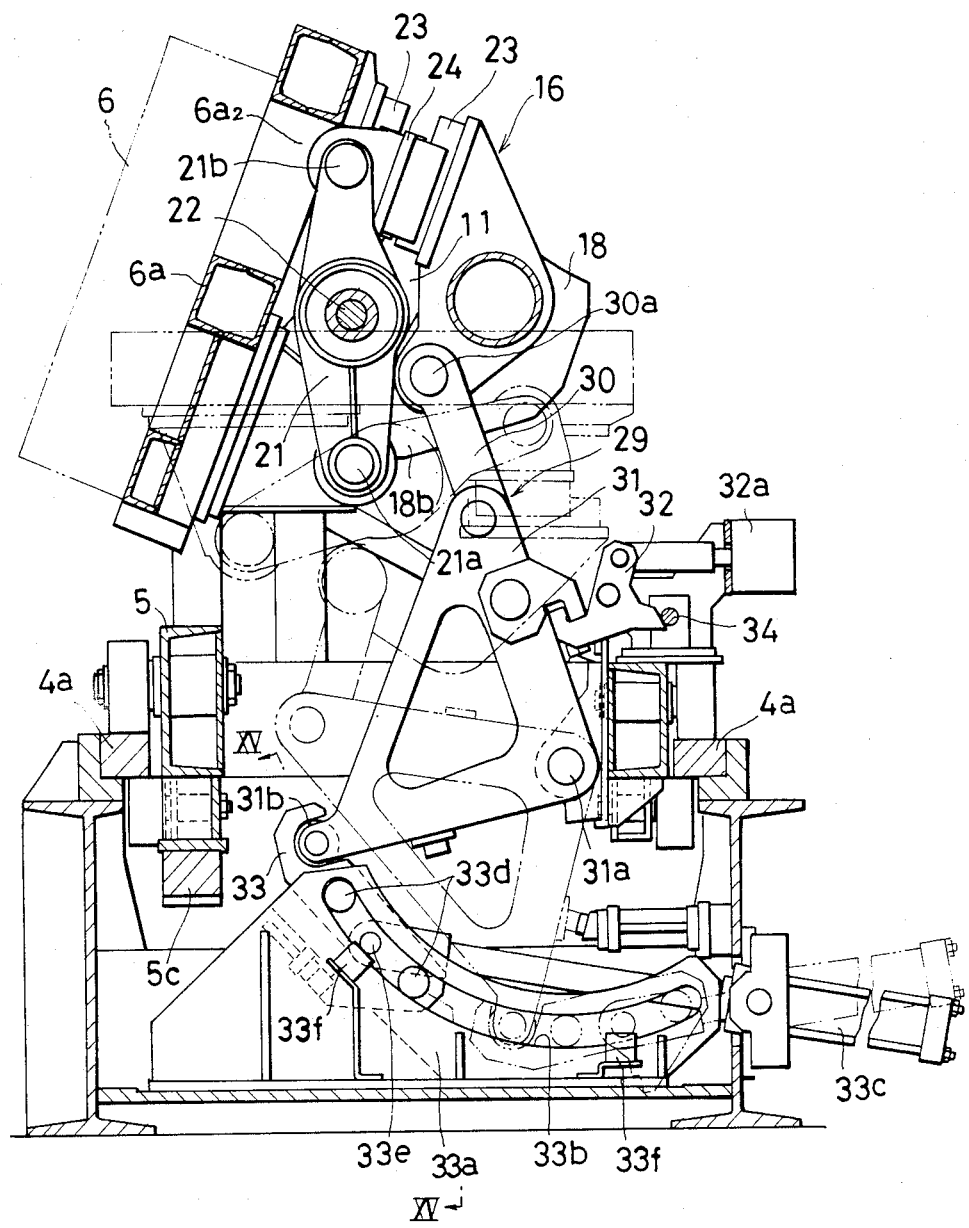
FIG. 11 is a sectional view taken along the line XI—XI in FIG. 9.
Figure 15:
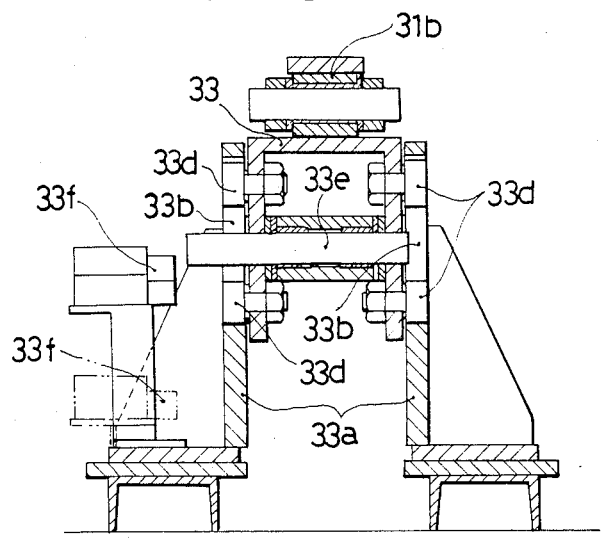
FIG. 15 is a sectional view taken along the line XV—XV in FIG. 11.

The link mechanism 29 comprises, as shown clearly in FIGS. 11 and 15 an upper link 30 which is pivotally attached, through a pivot shaft 30a, to a lower portion of the middle of the link base 18, and a triangular lower link 31 which is pivotally attached, through a pivot shaft 31a, to a rear portion of the set carrier 5 so that, in an ordinary condition, the lower link 31 may be locked in its elevated position for keeping the link base 18 in a raised condition by a lock member 32 arranged to be moved with a lock cylinder 32a on the set carrier 5.

Additionally, there is provided at the set station 1, a driving mechanism for a hook 33 which is in engagement with a roller 31b attached to a movable end of a lower front portion of the lower link 31. The lower link 31 is arranged to be movable about the pivot shaft 31a to advance and retreat along arc cam grooves 33b, 33b that are made in cam plates 33a, 33a on both sides of the hook 33 so that if the locking operation by the locking member 32 is released or unlocked and the hook 33 is moved to retreat, the lower link 31 may be moved downwards, as shown by imaginary lines in FIGS. 8 and 11. In this manner, the link base 18 may be moved to incline downwards about the pivot support point 18a through the upper link 30, and in conjunction therewith the whole of the X link mechanism 16 including the jig base 6a may be in a similar manner, inclined downwards about the support point 18a. As a result, the set jig 6 is brought downwards in its horizontal posture.

The reason the foregoing driving mechanism for inclining the link base 18 is not provided on the set carrier 5 but is provided on the set station 1 is for the purpose of obtaining an increase in the moving speed of the set carrier 5 without increasing the weight thereof.

Referring to the drawings, a guide roller 33d for the hook 33 is inserted in the cam groove 33b. A connecting pin 33e is provided for the cylinder 33c. An operation confirmation switch 33f for the hook 33 cooperates with the pin 33e. A safety pin 34 is provided for restraining the lock member 32 in its lock position. An operation cylinder 34a is provided for the safety pin. An operation confirmation switch 34b is provided for the safety pin 34.

Figure 12:
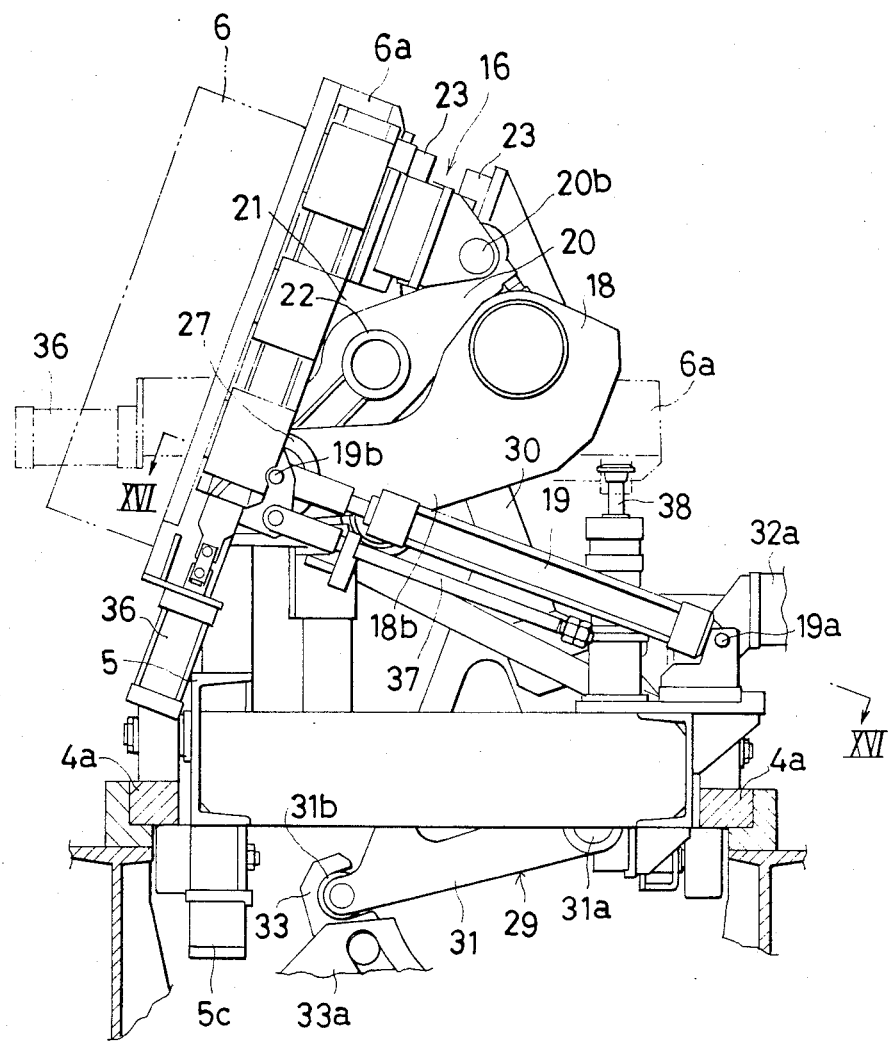
FIG. 12 is a sectional view taken along the line XII—XII in FIG. 9.
Figure 16:
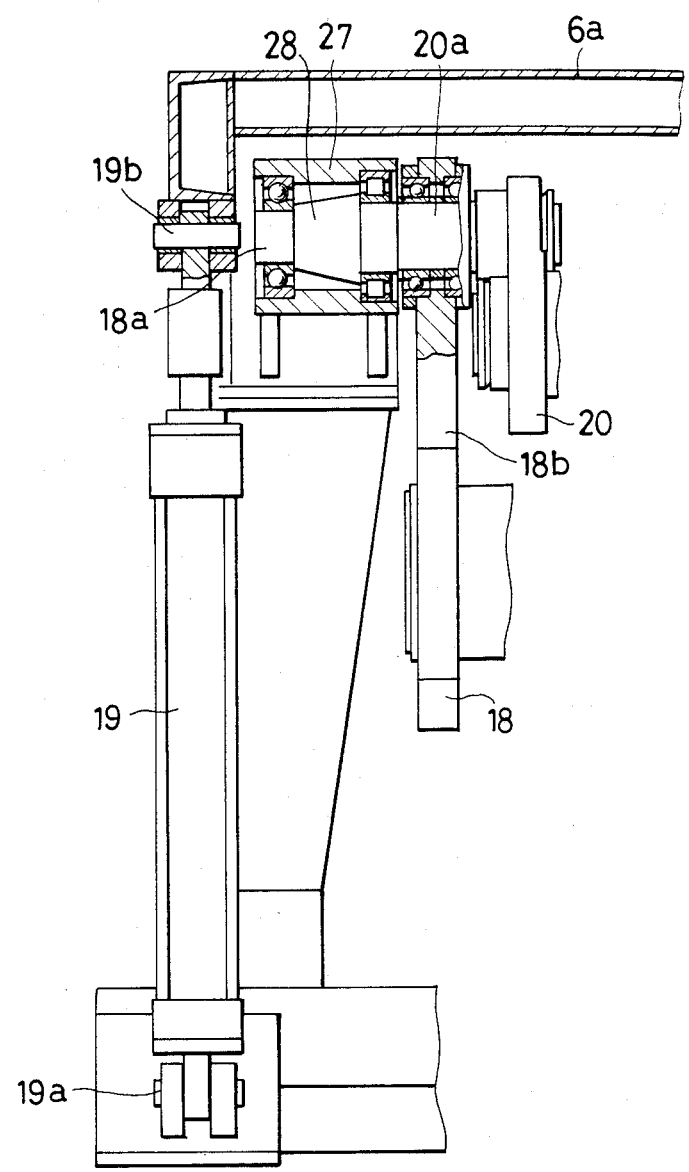
FIG. 16 is a sectional view taken along the line XVI—XVI in FIG. 12.

In the above example, the foregoing driving cylinder 19 is constructed, as shown clearly in FIG. 12, to be extended forwards along the X axis from its rearward end connecting support point 19a on the set carrier 5, and is pivotally attached, at its connecting support point 19b on a forward end of a piston rod thereof, to a longitudinal side portion of the jig base 6a so that the connecting support point 19b may be brought in alignment with the axis of the foregoing pivot support point 18a, when the set jig 6 is retreated, as shown in FIG. 16. Accordingly, if the set jig 6 is retreated and the link base 18 is inclined as mentioned above, the jig base 6a is turned in relation to the driving cylinder 19, about the connecting support point 19b which is in alignment with the pivot support point 18a, so that even of the cylinder 19 is forced to be kept under pressure in its contracted condition so as not to expand freely, the jig base 6a can be inclined without being subjected to any restricting force by the cylinder 19. Thus, changeover of the posture of the set jig 6 can be carried out smoothly.

Under the condition that the set jig 6 is brought down in its horizontal posture, a jig clamp cylinder 35 on a rear surface of the jig base 6a and a jig lift cylinder 36 on a side portion thereof are operated. Thereby, attaching and detaching operations of the set jig 6 is relation to the jig base 6a for replacement thereof with a new one are carried out.

Referring to the drawings, a stopper rod 37 is provided on a lower side of the driving cylinder 19 for regulating the moving stroke of the set jig 6. A cushion rod 38 is provided on the set carrier 5 for receiving the jig base 6a when the jig base 6a is brought down in its horizontal posture.

The above has been the explanation about the mechanism for the lateral movement of the set jig 6.

Figure 17:
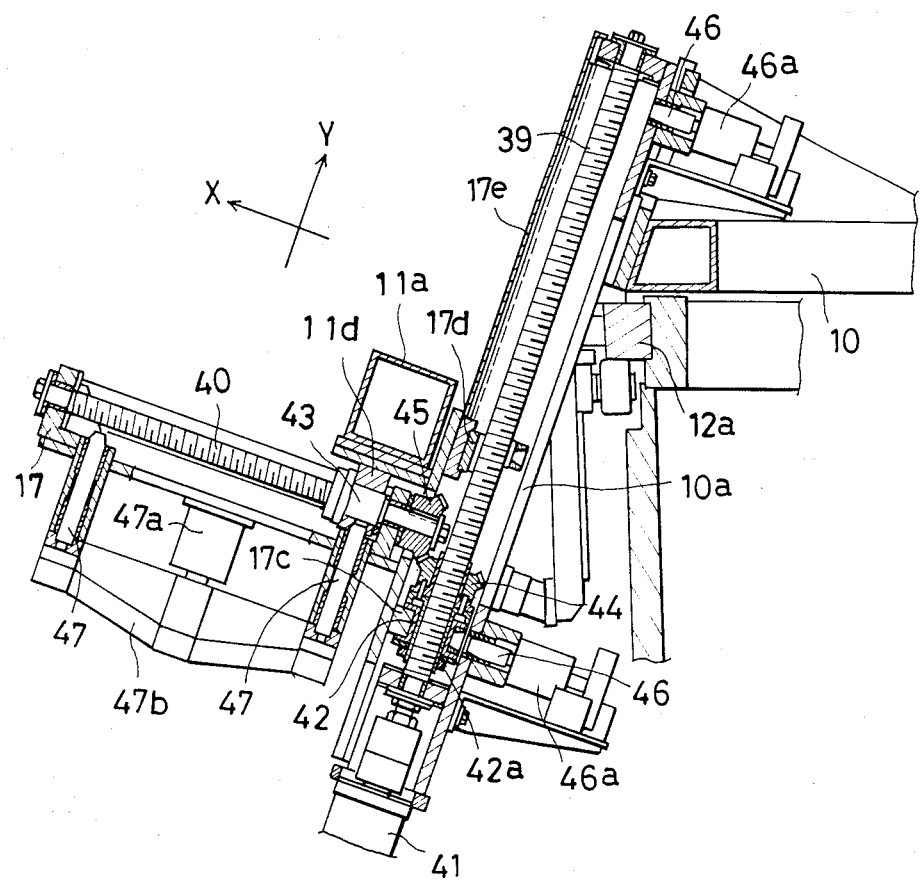
FIG. 17 is an enlarged sectional view of a moving mechanism of a discharging jig, taken along th line XVII—XVII in FIG. 3.
Figure 18:
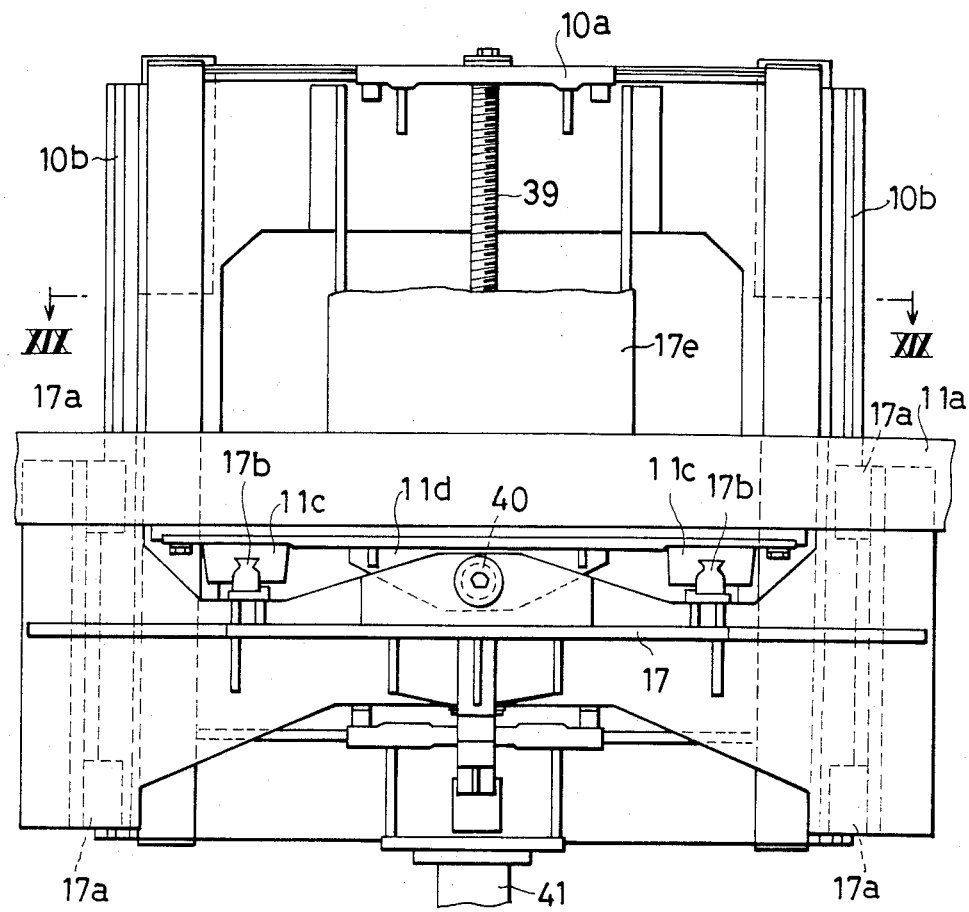
FIG. 18 is a side view of the moving mechanism viewed according to an arrow direction of the X axis in FIG. 17.

Next, a mechanism for moving the discharging jig 11 in the upper and lower and lateral directions will be explained with reference to FIGS. 17-19 as follows:

The jig 11 is movable laterally along the X axis in slightly obliquely upward and downward directions and is also movable upwards and downwards along the Y axis crossing at right angles the X axis in the same manner as the set jig 6.

If the moving directions of the discharging carrier 10 are assumed to be left and right directions, a pair of guide rails 10b, 10b which are long along the Y axis are fixedly provided on the left side portion and the right side portion of the guide frame 10a extending downwards from the carrier 10. The supporting frame 17 projecting forwards along the X axis from the guide frame 10a is slidably supported, at its sliders 17a, 17a provided on both side portions thereof, on the guide rails 10b, 10b. A pair of left and right guide rails 17b, 17b which extend long along the X axis are fixedly provided on the supporting frame 17. The jig base 11a of the discharging jig 11 is slidably supported, at its sliders 11c, 11c provided on a lower surface thereof, on the guide rails 17b, 17b.

The guide frame 10a and the supporting frame 17 are provided, at each middle portion thereof, with a first screw rod 39 which extends long along the Y axis and a second screw rod 40 which extends long in the X axis. A driving source 41 comprising an oil pressure motor is attached to a lower end of the guide frame 10a so that the first screw rod 39 may be rotated in regular and reverse directions by the driving source 41. A first nut sleeve 42 is threaded engagement with the periphery of the first screw rod 30, and a second nut sleeve 43 is in threaded engagement with the periphery of the second screw rod 40. The first nut sleeve 42 is inserted turnably from above through a boss portion 17c projecting from a lower portion of a rearward surface of the supporting frame 17 and is prevented from coming off from the boss portion 17c by a nut 42a applied to the lower end thereof so that the same is restrained immovably along the Y axis in relation to the supporting frame 17. Additionally, a driving gear 44 comprising a bevel gear is fixed to an upper end of the first nut sleeve 42, and is meshed with a driven gear 45 comprising a bevel gear fixed to a rear end of the second screw rod 40. The second nut sleeve 43 is fixed to the jig base 11a through a holder 11d projecting from a lower surface of the jig base 11a.

Additionally, the guide frame 10a, is provided with a pair of upper and lower first stopper members 46, 46 for stopping the supporting frame 17 at predetermined positions along the Y axis for instance, at its upper end position and at its lower position. The supporting frame 17 is provided with a pair of front and rear second stopper members 47, 47 for stopping the jig base 11a at a predetermined positions along the X axis, for instance, its advanced end position and its retreated end position.

More in detail, there is provided on a rear surface of the supporting frame 17, in addition to the foregoing lower boss portion 17c, an upper boss portion 17d projecting therefrom and loosely mounted on the first screw rod 39. The first stopper member 46 at an upper end position to be brought into engagement with the upper boss 17d at the elevated end position of the supporting frame 17, and the first stopper member 46 at a lower end position to be brought into engagement with the lower boss portion 17c at the lowered end position of the supporting frame frame 17 are provided on the guide frame 10a projectable forwards by respective cylinders 46a. Additionally, the pair of front and rear second stopper members 47, 47 to be brought into engagement with the foregoing holder 11d on the lower surface at the advanced end position and at the retreated end position are provided on the supporting frame 17 projectable upwards by a single common cylinder 47a. A connecting member 47b is arranged to be moved with the cylinder 47a and is provided with the second stopper members 47, 47. A cover 17e covers the first screw rod 39 and is attached to the supporting frame 17.

The foregoing arrangement is operated whereby if the supporting frame 17 is restrained at a predetermined position along the Y axis by the first stopper member 46, and the first screw rod 39 is rotated by the driving source 41, the first nut sleeve 42 which is restrained in the Y axial direction in relation to the supporting frame 17 is rotated, at a fixed position, integrally with the first screw rod 39, and consequently the second screw rod 40 is rotated through the driving gear 44 and the driven gear 45, and the jig base 11a is moved along the X axis through the second nut sleeve 43.

If, further, the jig base 11a is stopped at a predetermined position along the X axis by the second stopper member 47, and the supporting frame 17 is released from being restrained by the first stopper member 46, the rotation of the second screw rod 40 is restrained, and the rotation of the first nut sleeve 42 is connected thereto through the driven gear 45 and the driving gear 44 is also restrained so that the first nut sleeve 42 may be moved along the Y axis in accordance with the rotation of the first screw rod 39. In this manner, the supporting member 17 is moved so that the jig 11a may be given a movement along the Y axis.

Next, the transferring operation of the side panel W to the sealing jig 15 will be explained as follows:

Firstly, under the condition that the supporting frame 17 is restrained at its lowered end position, the first screw rod 39 is rotated in the regular direction, whereby the discharging jig 11 is advanced along the X axis through the second nut sleeve 43. Thereafter, the jig 11 is restrained at its advanced end position and the restraining of the supporting frame 17 is released. The first screw rod 39 is rotated again in the regular direction, whereby the supporting frame 17 is moved upwards along the Y axis through the first nut sleeve 42, and at the elevated end position thereof the transfer of the side panel W is carried out.

Thereafter, the supporting frame 17 is restrained at the elevated end position, and the restraining of the jig 11 is released. The first screw rod 39 is then rotated in the reverse direction, whereby the jig 11 is retreated along the X axis through the second nut sleeve 43. Thereafter, the jig 11 is restrained at its retreated end position and the supporting frame 17 is released from being restrained. The first screw rod 39 is rotated again in the reverse direction, whereby the supporting frame 17 is lowered along the Y axis through the first nut sleeve 42, so that the jig 11 is returned to its original position.

As described above, the discharging jig 11 can be moved in the lateral direction and in the upper and lower directions by the single common driving source 41, so that, as compared with the case where respective driving sources are provided for the lateral direction and for the upper and lower directions, the moving mechanism can be made small-sized, at a low price and without spoiling the movability of the discharging jig 11.

Thus, according to this invention, the side panel can be set in its standing posture on the set jig, and thereby the setting work thereof can be facilitated. Also, the welding equipments comprising the holding members and the welding robots can be disposed on one lateral side of the welding station, so that the lateral width of the welding station can be decreased. Additionally, it becomes possible that, during the welding operation, the set carrier is returned to the set station to be ready for setting of the next side panel, and as a result the time interval between the setting works can be shortened.

According to the second aspect of this invention, through the discharging jig provided on the discharging carrier, the side panel after being subjected to the welding operation is conveyed from the welding station to the sealing station, and is transferred to the sealing jig, so that during the sealing operation, the discharging carrier can be returned to the welding station to be ready for the next conveying of the next side panel after being welded from the welding station. Thereby the working efficiency can be improved. Additionally, by the offset disposition of the railway for the discharging carrier from the railway for the set carrier, the extended space left ahead of the railway for the set carrier can be effectively utilized for the space for installing the sealing jig, the applying robot or the like, and at the same time the width of the whole of the working line can be narrowed as much as possible.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A working line for a preparing side panel for a motorcar comprising a set station, a welding station downstream of the set station, a railway extending between the set station and the welding station, a set carrier loaded with a set jig on which a side panel is settable in its standing posture from one lateral side reciprocatable between the set station and the welding station on the railway, and holding members for the side panel and welding robots provided at the welding station positioned on one lateral side of the railway for the set carrier so that, at the welding station, the side panel on the set jig may be transferred, as it is in its standing posture, to the holding members wherein a jig base for attaching the set jig is so supported, through a X link mechanism on a link base provided on the set carrier as to be movable laterally so that, by a lateral movement of the set jig by the X link mechanism, transfer of the side panel to the holding members may be carried out.

2. A working line as claimed in claim 1, wherein a slide support point of each link of the X link mechanism in relation to each base is formed of a supporting shaft attached to a slider supported slidably through a slide bearing on a guide rail fixed to each base.

3. A working line as claimed in any one of claims 1 or 2 wherein the X link mechanism is so constructed that at an intermediate position of the moving stroke of the jig base the respective links of the X link mechanism, may be brought into alignment one with another on a common plane crossing at right angles the moving direction of the jig base.

4. A working line as claimed in claim 3 wherein the link base is supported on the set carrier swingable upwards and downwards, and a driving cylinder for expanding and contracting the X link mechanism in the moving direction of the jig base is so provided between the jig base and the set carrier that, at a retreated end position of the moving stroke of the jig base, a connection point of the cylinder in relation to the jig base is brought into alignment with an axis of the pivot support point of the link base.

5. A working line as claimed in any one of claims 1 or 3 wherein the link base is supported on the set carrier swingable upwards and downwards, and a driving cylinder for expanding and contracting the X link mechanism in the moving direction of the jig base is so provided between the jig base and the set carrier that, at a retreated end position of the moving stroke of the jig base, a connection point of the cylinder in relation to the jig base is brought into alignment with an axis of the pivot support point of the link base.

6. A working line for preparing a side panel for motorcar, comprising a set station, a welding station downstream of the set station, a sealing station downstream of the welding station, a set carrier railway extending between the set station and the welding station, a set carrier loaded with a set jig on which the side panel is settable, in its standing posture, from one lateral side reciprocatable between the set station and the welding station on the set carrier railway, holding members for the side panel and welding robots provided on the welding station positioned on one lateral side of the railway for the set carrier so that, at the welding station, the side panel on the set jig may be transferred, as it is in its standing posture, to the holding members, a discharging carrier railway laid to be offset sideways in relation to the railway for the set carrier and extending between the welding station and the sealing station, a discharging carrier loaded with a discharging jig for receiving the side panel after being welded by the welding robots, from the holding members, as it is in its standing posture reciprocatable between the welding station and the set station on the discharging carrier railway, an application robot for applying a sealing agent to the welded side panel and a sealing jig for holding the side panel disposed at the sealing station opposite one to another and on both lateral sides of the railway for the discharging carrier so that, at the sealing station, the welded side panel on the discharging jig may be transferred, as it is in its standing posture, to the sealing jig.

7. A working line as claimed in claim 6, wherein a supporting frame for supporting laterally movably a jig base for attaching the discharging jig is provided on the discharging carrier, said supporting frame being movable upwards and downwards so that, by upper and lower movements of the supporting frame, the discharging jig may be movable upwards and downwards between its elevated position for transferring the side panel to the sealing jig and its lowered position located below the side panel held by the sealing jig.

8. A working line as claimed in claim 7, wherein the discharging carrier is provided with an upper and lower directional long first screw rod which is rotatable in regular and reverse directions by a driving source mounted on the carrier, and the supporting frame is provided with a lateral directional long second screw rod, and a first nut sleeve which is pivotally supported immovably in upper and lower directions in relation to the supporting frame is in threaded engagement with the first screw rod, and a second nut sleeve which is fixed to the jig base is in threaded engagement with the second screw rod, and the first nut sleeve is meshed, at a driving gear fixed thereto with a driven gear fixed to the second screw rod, and there is provided a first stopper member for stopping the supporting frame at a predetermined position in the upper and lower directions, and a second stopper member for stopping the jig base at a predetermined position in the lateral direction.

9. A working line as claimed in claim 6, wherein a jig base for attaching the set jig is so supported, through a X link mechanism on a link base provided on the set carrier as to be movable laterally so that, by a lateral movement of the set jig by the X link mechanism, transfer of the side panel to the holding members may be carried out.

10. A working line as claimed in claim 9, wherein a slide support point of each link of the X link mechanism in relation to each base is formed of a supporting shaft attached to a slider supported slidably through a slide bearing on a guide rail fixed to each base.

11. A working line as claimed in any one of claims 9 or 10 wherein the X link mechanism is so constructed that at an intermediate position of the moving stroke of the jig base the respective links of the X link mechanism, may be brought into alignment one with another on a common plane crossing at right angles the moving direction of the jig base.

12. A working line as claimed in claim 11 wherein the link base is supported on the set carrier swingable upwards and downwards, and a driving cylinder for expanding and contracting the X link mechanism in the moving direction of the jig base is so provided between the jig base and the set carrier that, at a retreated end position of the moving stroke of the jig base, a connection point of the cylinder is relation to the jig base is brought into alignment with an axis of the pivot support point of the link base.

13. A working line as claimed in any one of claims 9 or 10 wherein the link base is supported on the set carrier swingable upwards and downwards, and a driving cylinder for expanding and contracting the X link mechanism in the moving direction of the jig base is so provided between the jig base and the set carrier that, at a retreated end position of the moving stroke of the jig base, a connection point of the cylinder is relation to the jig base is brought into alignment with an axis of the pivot support point of the link base.

* * * * *

UNITED STATES PATENT AND TRADEMARK OFFICE
CERTIFICATE OF CORRECTION

PATENT NO. : 4,813,587
DATED : March 21, 1989
INVENTOR(S) : KADOWAKI et al

It is certified that error appears in the above-identified patent and that said Letters Patent is hereby corrected as shown below:

Column 14, line 45, "railway, an" should read --railway, and an--.

Column 16, line 13, "cylinder is" should read --cylinder in--.

Column 16, line 23, "cylinder is" should read --cylinder in--.

Signed and Sealed this

Seventeenth Day of April, 1990

Attest:

HARRY F. MANBECK, JR.

Attesting Officer

Commissioner of Patents and Trademarks